United States Patent
Gindele et al.

(10) Patent No.: US 6,718,068 B1
(45) Date of Patent: Apr. 6, 2004

(54) NOISE REDUCTION METHOD UTILIZING STATISTICAL WEIGHTING, APPARATUS, AND PROGRAM FOR DIGITAL IMAGE PROCESSING

(75) Inventors: Edward B. Gindele, Rochester, NY (US); Jiebo Luo, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/522,742

(22) Filed: Mar. 10, 2000

(51) Int. Cl.[7] .................................................. G06R 9/40
(52) U.S. Cl. .................. 382/254; 382/260; 382/275
(58) Field of Search ........................ 382/266, 254, 382/260–264, 272, 172

(56) References Cited

U.S. PATENT DOCUMENTS

| | | | |
|---|---|---|---|
| 5,594,816 A | 1/1997 | Kaplan et al. | 382/275 |
| 5,671,264 A | 9/1997 | Florent et al. | 378/98 |
| 5,809,178 A * | 9/1998 | Anderson et al. | 382/251 |
| 5,923,775 A * | 7/1999 | Snyder et al. | 382/172 |
| 6,069,982 A * | 5/2000 | Reuman | 382/275 |
| 6,118,906 A * | 9/2000 | Keyes et al. | 382/266 |

OTHER PUBLICATIONS

J–S. Lee, "Digital Image Smoothing and the Sigma Filter," *Computer Vision, Graphics, and Image Processing* 24, 1983, pp. 255–269.

Arce et al., "Theoretical Analysis of the Max/Median Filter," *IEEE Transactions on Acoustics, Speech, and Signal Processing*, vol. ASSP–35, No. 1, Jan. 1987, pp. 60–69.

Nagao et al., "Edge Preserving Smoothing," *Computer Graphics and Image Processing* 9, 1979, pp. 394–407.

* cited by examiner

*Primary Examiner*—Leo Boudreau
*Assistant Examiner*—Duy M. Dang
(74) *Attorney, Agent, or Firm*—Thomas H. Close

(57) ABSTRACT

A method of processing a digital image channel to remove noise, includes the steps of: identifying a pixel of interest; identifying at least two sampled local regions of pixels which include the pixel of interest; calculating a noise free pixel estimate for each sampled local region of pixels; calculating a statistical weighting factor for each sampled local region, the calculation of the statistical weighting factor being independent of the calculation of the noise free pixel estimate; and using the noise free pixel estimates and the statistical weighting factors for calculate a noise reduced pixel value.

21 Claims, 6 Drawing Sheets

Figure 2 (image processor configuration)

NOISE REDUCTION METHOD UTILIZING STATISTICAL WEIGHTING, APPARATUS, AND PROGRAM FOR DIGITAL IMAGE PROCESSING

FIELD OF INVENTION

The present invention relates to a method, apparatus, and computer program for processing digital images to reduce noise.

BACKGROUND OF THE INVENTION

Many image processing noise reduction algorithms can be classified as non-linear spatial filters. Often these algorithms involve using the pixel values in a small local neighborhood surrounding the pixel of interest combined with some form of non-linear weighting and/or statistical conditions applied to the pixels in the neighborhood to derive a noise free estimate of the pixel of interest. The small local neighborhood is usually centered on the pixel of interest. For this class of noise reduction algorithms the filter size is fixed, meaning that all image pixels are processed with the same size local neighborhood. The most common shape to the local neighborhood is a rectangular region centered about the pixel of interest. Such a region can be characterized by a width and height. Usually the width and height dimensions are chosen to be symmetric.

An example of a fixed size rectangular region noise reduction algorithm is the Sigma Filter, described by Jong-Son Lee in the journal article "Digital Image Smoothing and the Sigma Filter", *Computer Vision, Graphics, and Image Processing*, Vol. 24, 1983, pp. 255–269. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma Filter can be represented as $$q_{mn} = \Sigma_{ij} a_{ij} p_{ij} / \Sigma_{ij} a_{ij} \quad (1)$$

where:

$a_{ij}=1$ if $|p_{ij}-p_{mn}| \leq \epsilon$, $a_{ij}=0$ if $|p_{ij}-p_{mn}| > \epsilon$.

where $p_{ij}$ represents the pixels in the local surround about the center pixel $p_{mn}$, $q_{mn}$ represents the noise cleaned pixel, and $\epsilon$ represents a numerical constant usually set to two times the expected noise standard deviation. The local pixels are sampled from a rectangular region centered about the pixel of interest.

The Sigma Filter was designed for image processing applications for which the dominant noise source is Gaussian additive noise. Signal dependent noise sources can easily be incorporated by making the e parameter a function of the signal strength. However, for both signal independent and signal dependent noise cases the expected noise standard deviation must be known to obtain optimal results. The Sigma Filter performs well on highly structured areas due to the fact that most of the image pixels in the local neighborhood are excluded from the averaging process. This leaves high signal strength regions nearly unaltered. The filter also works well in large uniform areas devoid of image signal structure due to the fact that most of the local pixels are included in the averaging process. For these regions, the Sigma Filter behaves as a low pass spatial filter with a rectangular shape. This low-pass spatial filter shape does not filter very low spatial frequency components of the noise. The resulting noise reduced images can have a blotchy or mottled appearance in otherwise large uniform areas.

Regions in images characterized by low amplitude signal modulation, or low signal strength, are not served well by the Sigma Filter. For these regions, most of the local pixel values are included in the averaging process thus resulting in a loss of signal modulation. Setting the threshold of the filter to a lower value does reduce the loss of signal, however, the noise is left mostly the same.

Another example of a fixed size non-linear noise filter was reported by Arce and McLoughlin in the journal article "Theoretical Analysis of the Max/Median Filter", *IEEE Transactions Acoustics, Speech and Signal Processing*, ASSP-35, No. 1, January 1987, pp. 60–69, they named the Max/Median Filter. This filter separated the local surround region into four overlapping regions—horizontal, vertical, and two diagonal pixels with each region containing the center pixel. A pixel estimate was calculated for each region separately by applying and taking the statistical median pixel value sampled from the regions' pixel values. Of these four pixel estimates, the maximum valued estimate was chosen as the noise cleaned pixel. Mathematically the Max/Median Filter can be represented as $$q_{ij} = \text{maximum of } \{Z_1, Z_2, Z_3, Z_4\} \quad (2)$$

$$Z_1 = \text{median of } \{p_{i,j-w}, \ldots p_{ij}, \ldots, p_{ij+w}\}$$

$$Z_2 = \text{median of } \{p_{i-w,j}, \ldots p_{ij}, \ldots, p_{i+w,j}\}$$

$$Z_3 = \text{median of } \{p_{i+w,j-w}, \ldots p_{ij}, \ldots, p_{i-w,j+w}\}$$

$$Z_4 = \text{median of } \{p_{i-w,j-w}, \ldots p_{ij}, \ldots, p_{i+w,j+w}\}$$

where $q_{ij}$ represents the noise cleaned pixel, $Z_1$, $Z_2$, $Z_3$, and $Z_4$ represent the four pixel estimates, and $p_{ij}$ represents the local pixel values. The Max/Median Filter also reduces the noise present while preserving edges. For Gaussian additive noise, the statistical median value does not reduce the noise by as great a factor as numerical averaging. However, this filter does work well on non-Gaussian additive noise such as spurious noise.

Noise is most visible and objectionable in images containing areas with little signal structure, e.g. blue sky regions with little or no clouds. The Sigma filter can produce a blotchy, or mottled, effect when applied to image regions characterized by low signal content. This is largely due to the rectangular geometric sampling of local pixels strategy. The radial region sampling strategy employed by the Max/Median Filter produces noise reduced images with less objectionable artifacts in image regions characterized by low signal content. For images with high noise content, the artifacts produced by radial region sampling strategy have a structured appearance.

Nagao and Matsuyama described an edge preserving spatial filtering technique in their publication, "Edge Preserving Smoothing," in *Computer Vision, Graphics, and Image Processing*, Vol. 9, pp. 394–407, 1979. Nagao formed multiple local regions about the center pixel by rotating a line segment inclusion mask pivoting about the center pixel. Imagine each spatial region of pixels corresponding to a different orientation of the hour hand of a clock. For each region, the statistical variance and numerical mean are calculated. The noise cleaned pixel value is assigned as the numerical mean of the region with the lowest statistical variance. This filter does not assume a prior knowledge of the noise magnitude. If the magnitude of the inherent image structure is greater than the noise, the Nagao filter will reduce some noise while preserving edge structure. Unfortunately, the filter suffers from two problems. The size of the statistical sampling is relatively small since only one local region effectively contributes to the pixel estimation process. The other problem with this filter results from the fact that some image structure content is always degraded due to the fact that at least one region's numerical mean replaces the original pixel value. In addition, significant artifacts (distortions to the true image structure) can occur.

U.S. Pat. No. 5,671,264, issued Sep. 23, 1997 to Florent et al., entitled "Method for the Spatial Filtering of the Noise in a Digital Image, and Device for Carrying Out the Method", describes a variation of the Sigma Filter and Max/Median Filter. This algorithm borrows the technique of radial spatial sampling and multiple pixel estimates from the Max/Median Filter. However, the algorithm expands the number of radial line segment to include configurations with more than four segments. The algorithm uses combinations of Sigma and Median filters to form the individual region pixel estimates. These pixel estimates derived from the N regions are then combined by numerical averaging or taking the statistical median value to form the noise cleaned pixel value. A key component of this algorithm is the randomization of one of the three essential region parameters: length, orientation, and number of regions. The randomization of the filter parameters is performed on a pixel to pixel basis thus changing the inherent characteristics with pixel location. It is claimed that the randomization feature reduces the induced structured artifacts produced by the radial region geometry sampling method. The imaging application cited in U.S. Pat. No. 5,671,264 is medial x-ray imagery. This type of imagery is typically characterized by high noise content or a low signal-to-noise ratio. The structured artifacts introduced by the noise reduction algorithm are worse for low signal-to-noise ratio images.

U.S. Pat. No. 5,594,816, issued Jan. 14, 1997 to Kaplan et al. entitled "Computer Based Digital Image Noise Reduction Method Based on Over-Lapping Planar Approximation" describes a method of noise reduction including the steps of: a) identifying a pixel of interest; b) identifying multiple rectangular pixel regions which include the pixel of interest; c) calculating a noise free pixel estimate for each rectangular pixel region by performing a least squares fit of the pixels within the rectangular region with respect to a planar surface; d) calculating a goodness-of-fit statistical value of the planar model for the individual rectangular regions; and e) calculating a noise reduced pixel value using a weighted sum of the noise free pixel estimates based on the goodness-of-fit statistical values. While the method disclosed by Kaplan et al. involves weighting the multiple noise free estimates, the method is overly complicated and the calculation of the weighting factors is integrally related to the method of calculating the noise free pixel estimates.

The prior art methods of combining multiple pixel estimates from multiple local regions of pixels all suffer from an inability to adapt effectively to local image statistics. In structurally flat regions of images, the techniques of using the maximum of the estimates does not work well due to the fact that only one of the pixel estimates can contribute to the noise cleaning. Methods that use the arithmetic mean or median work much better in flat regions but suffer from over cleaning image regions in spatially active regions.

There is a need therefore for an improved noise reduction algorithm that operates well in both the flat and spatially active regions of an image.

SUMMARY OF THE INVENTION

The need is met according to the present invention by providing a method of processing a digital image channel to remove noise, including the steps of: identifying a pixel of interest; identifying at least two sampled local regions of pixels which include the pixel of interest; calculating a noise free pixel estimate for each sampled local region of pixels; calculating a statistical weighting factor for each sampled local region, the calculation of the statistical weighting factor being independent of the calculation of the noise free pixel estimate; and using the noise free pixel estimates and the statistical weighting factors for calculating a noise reduced pixel value.

The present invention overcomes the deficiency of using only one of the calculated noise free pixel estimates to form the noise reduced pixel value as exhibited by the Nagao et al. and Arce et al. algorithms. The present invention also overcomes the deficiency of using the median or mean methods of combining multiple noise free pixel estimates to form the noise reduced pixel as described by Nagao et al. and Florent et al. which gives too much emphasis to some of the noise free pixel estimates. The present invention allows all the calculated noise free pixel estimates to contribute in spatially flat image regions and for the noise free pixel estimates to contribute unequally in highly structured regions. This is achieved by the use of a statistical weighting factor which ranges in value for the individual sample local regions of pixels.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

General Description of a Digital Imaging System

Figure 2:
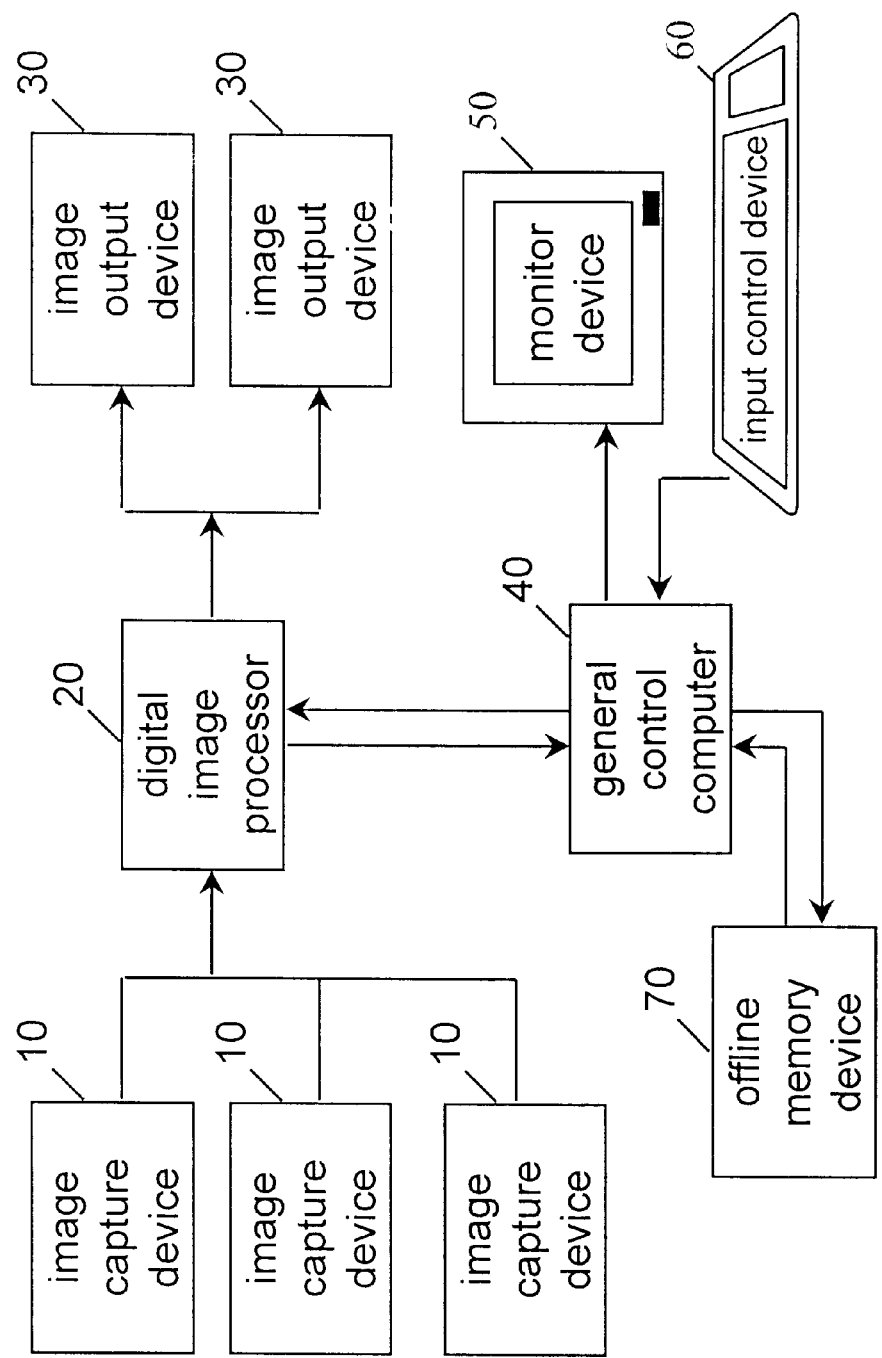
FIG. 2 is a functional block diagram showing the component parts of an apparatus implementation of the present invention.

The present invention may be implemented in computer hardware. Referring to FIG. 2, the following description relates to a digital imaging system which includes an image capture device 10, an digital image processor 20, an image output device 30, and a general control computer 40. The system may include a monitor device 50 such as a computer console or paper printer. The system may also include an input device control for an operator such as a keyboard and or mouse pointer 60. Multiple capture devices 10 are shown illustrating that the present invention may be used for digital images derived from a variety of imaging devices. For example, FIG. 2 may represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. Multiple image output devices 30 are shown illustrating that the present invention may be used in conjunction with a variety of output devices which may include a digital photographic printer and soft copy display. The digital image processor processes the digital image to adjust the overall brightness, tone scale, image structure etc. of the digital image in a manner such that a pleasing looking image is produced by an image output device 30. Those skilled in the art will recognize that the present invention is not limited to just these mentioned image processing modules.

The general control computer 40 shown in FIG. 2 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 2 may be located remotely and may be connected via a wireless connection.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. In fact, the present invention can be applied to any two dimensional array of noise corrupted data to obtain a noise cleaned output. Although the present invention describes a digital image channel as a two dimensional array of pixel values arranged by rows and columns, those skilled in the art will recognize that the present invention can be applied to mosaic (non rectilinear) arrays with equal effect. Those skilled in the art will also recognize that although the present invention describes replacing original pixel values with noise cleaned pixel values, it is also trivial to form a new digital image with the noise cleaned pixel values and retain the original pixel values in tact.

General Description of a Digital Image Processor 20

Figure 3:
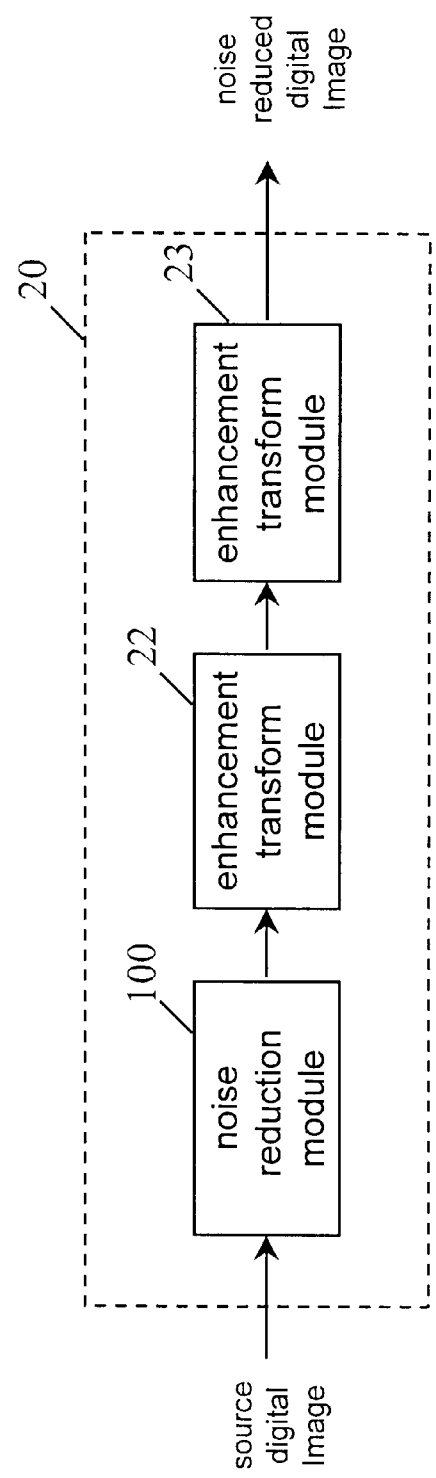
FIG. 3 is a functional block diagram of a method and software implementation of the image processor module employed by the preferred embodiment of the present invention.

The digital image processor 20 shown in FIG. 2 is illustrated in more detail in FIG. 3. The general form of the digital image processor 20 employed by the present invention is a cascaded chain of image processing modules. The source digital image is received by the digital image processor 20 which produces on output a processed digital image. Each image processing module contained within the digital image processor 20 receives a source digital image, modifies the source digital image, produces a processed digital image and passes the processed digital image to the next image processing module. Two enhancement transform modules 22 and 23 are shown within the digital image processor 20 to illustrate that the present invention can be used in conjunction with other image processing modules. Examples of enhancement transform modules 22 and 23 might include, but are not limited to, modules designed to sharpen spatial detail, enhance color, and enhance the tone scale of a digital image. Alternatively, an image processing module may be employed to analyze the source digital image may not immediately modify the pixels of the source digital image. The noise reduction module 100 receives the source digital image and produces a noise reduced digital image.

The noise reduction module 100 of the present invention implements a non-linear spatial filter noise reduction method. As such, the present invention relies on two main aspects which directly impact the image quality of results. A generalized non-linear spatial filter operation involves sampling the pixel values in multiple local region neighborhoods about a pixel of interest and applying mathematical logic to the local pixel values to calculate a noise free pixel estimate for each region, and calculating a single noise reduced pixel value from the multiple pixel estimates to form the processed pixel value. This procedure is repeated for some or all of the other pixels in the source digital image. A noise reduced digital image is formed from the processed pixel values.

Local Region Geometry

Figure 1:
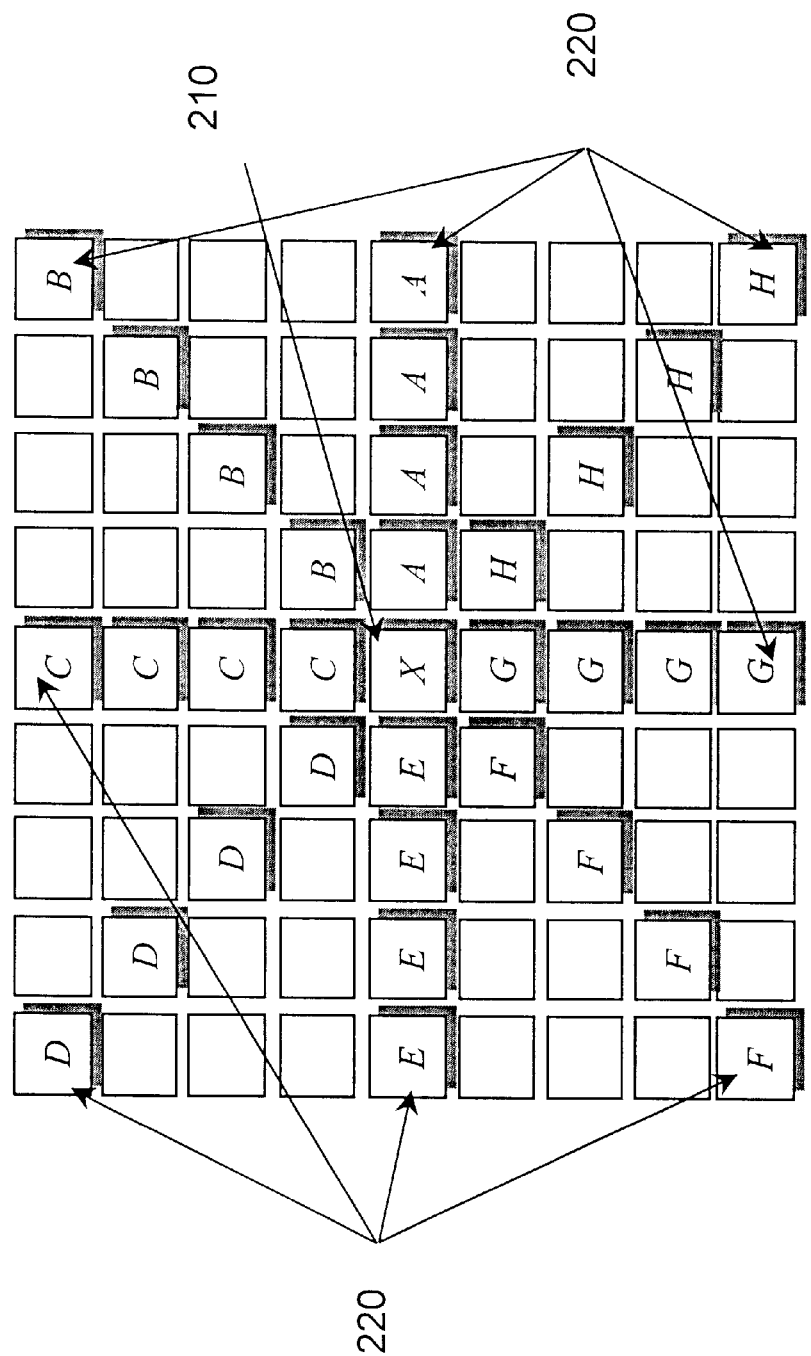
FIG. 1 is an example of the multiple sampled local regions of pixels for a 9 by 9 pixel neighborhood of pixels used by the preferred embodiment of the present invention.

The present invention uses more than one local region configured about a pixel of interest. FIG. 1 is an illustration of the multiple local regions sampled from a local neighborhood of pixels used by the preferred embodiment of the present invention. The pixels contained in the local region of pixels are segmented into local regions or groups of pixels with each local region including the pixel of interest 210 labeled with an X. The preferred embodiment of the present invention uses eight local regions where the pixels of each local region are labeled with the letters A, B, C, D, E, F, G and H respectively. The pixels shown in FIG. 1 with no labels do not contribute to the noise reduction process for the pixel of interest. The eight local regions shown in FIG. 1 each include the pixel of interest and are radially oriented with respect to the pixel of interest.

The local regions 220 illustrated in FIG. 1 are sampled from a 9 by 9 local neighborhood of pixels. The size of the local regions, or lengths of the radial configurations may be varied to achieve the system goals of compromises in computation resources versus effective noise removal. For example a local neighborhood of as little as 3×3 pixels to as large as 31×31 pixels have proven useful. As the size of the local region is increased the demands on computation resources also increases. However, effective noise removal is also enhanced with larger local region size. The present invention uses an 9 by 9 pixel local neighborhood of pixel as a reasonable compromise.

Figure 5:
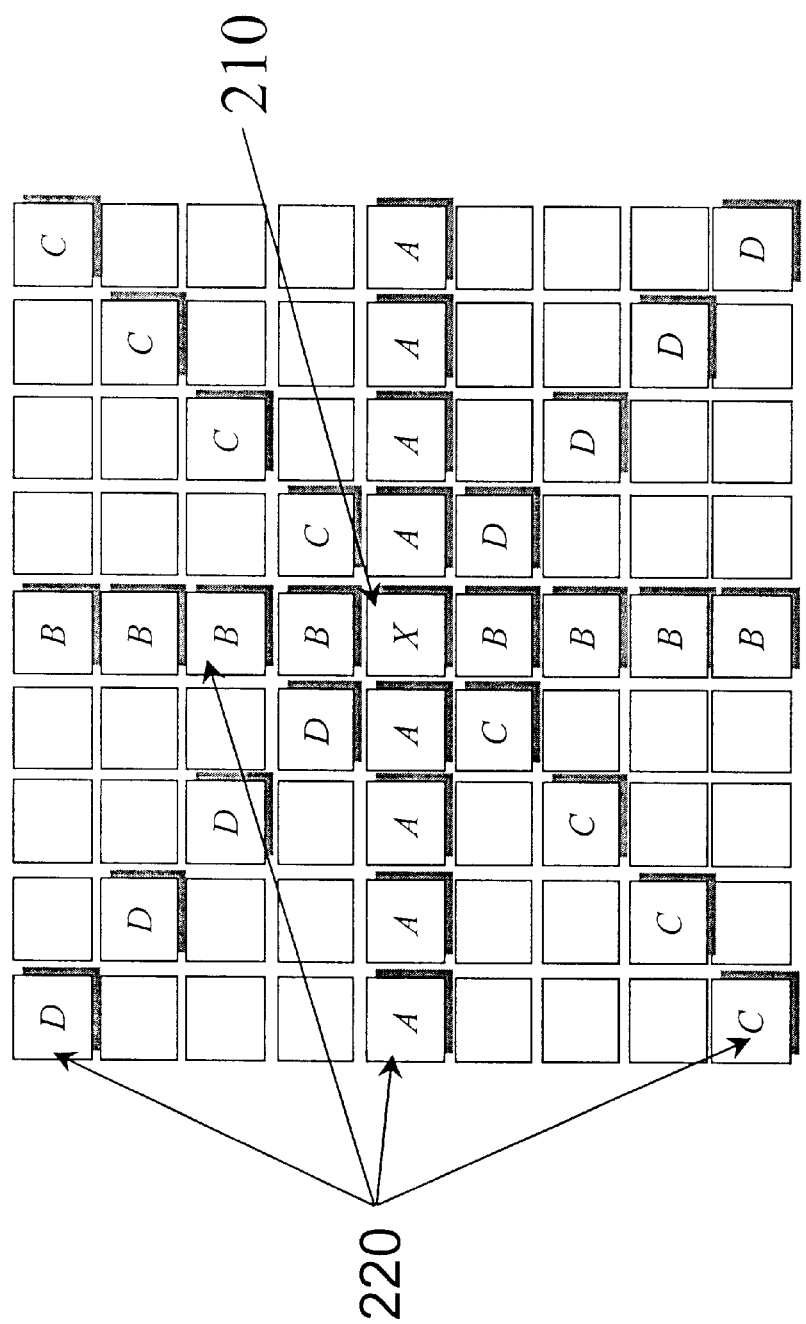
FIG. 5 is a diagram showing the multiple sampled local regions of pixels for a 9 by 9 pixel neighborhood of pixels used by an alternative embodiment of the present invention.

An alternative configuration of the local regions useful with the noise reduction method of the present invention is shown in FIG. 5. This alternative configuration uses four local regions A, B, C and D. The four local regions shown in FIG. 5 each include the pixel of interest and are radially oriented with respect to the pixel of interest.

Figure 6:
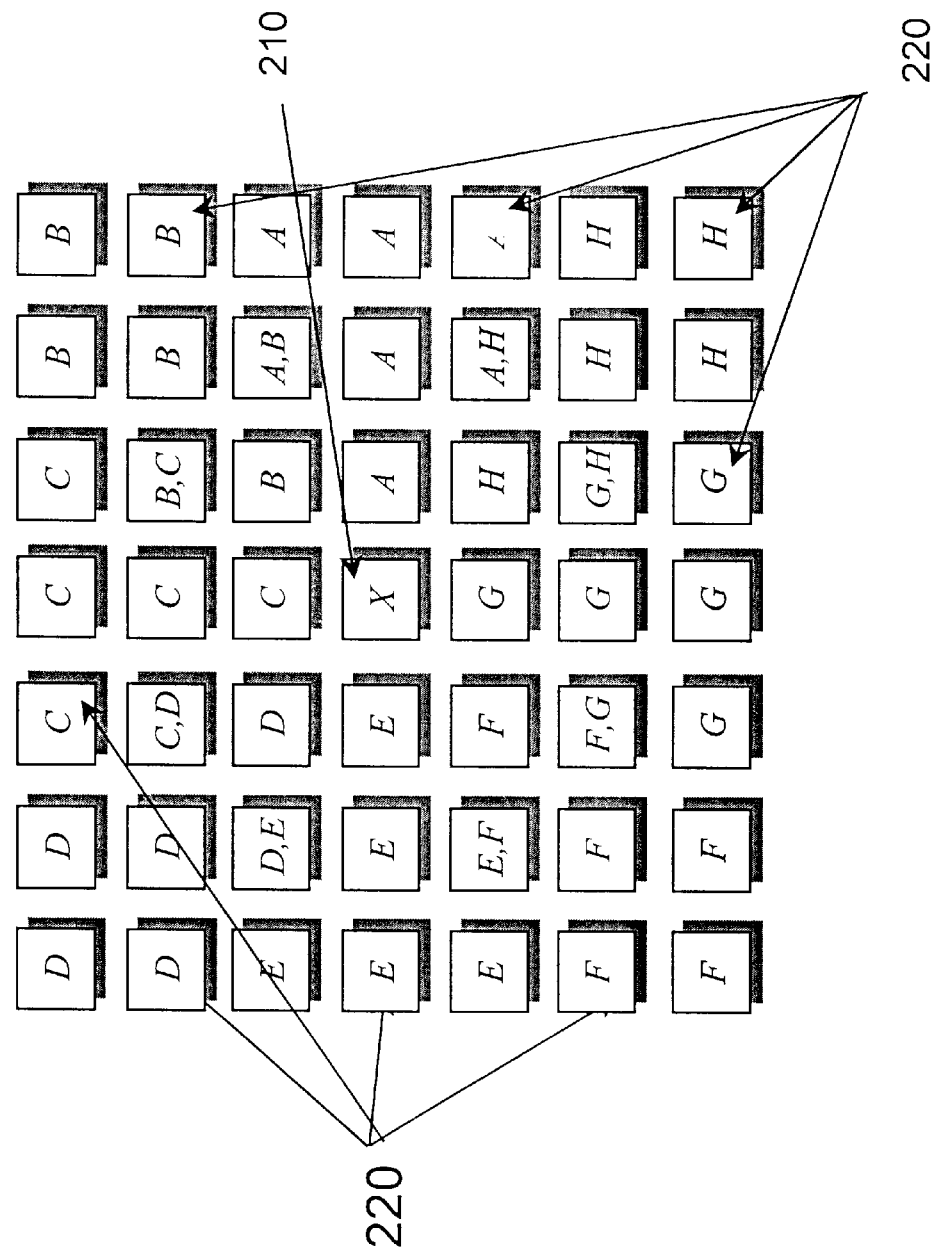
FIG. 6 is a diagram showing the multiple sampled local regions of pixels for a 9 by 9 pixel neighborhood of pixels used by a further alternative embodiment of the present invention.

A further alternative configuration of the local regions useful with the present invention is shown in FIG. 6. In this configuration the eight local regions A, B, C, D, E, F, G and H are radially oriented with respect to the pixel of interest, but are not simply linear arrangements of pixels, and some of the pixels are members of more than one local region.

Noise Reduction Module 100

Figure 4:
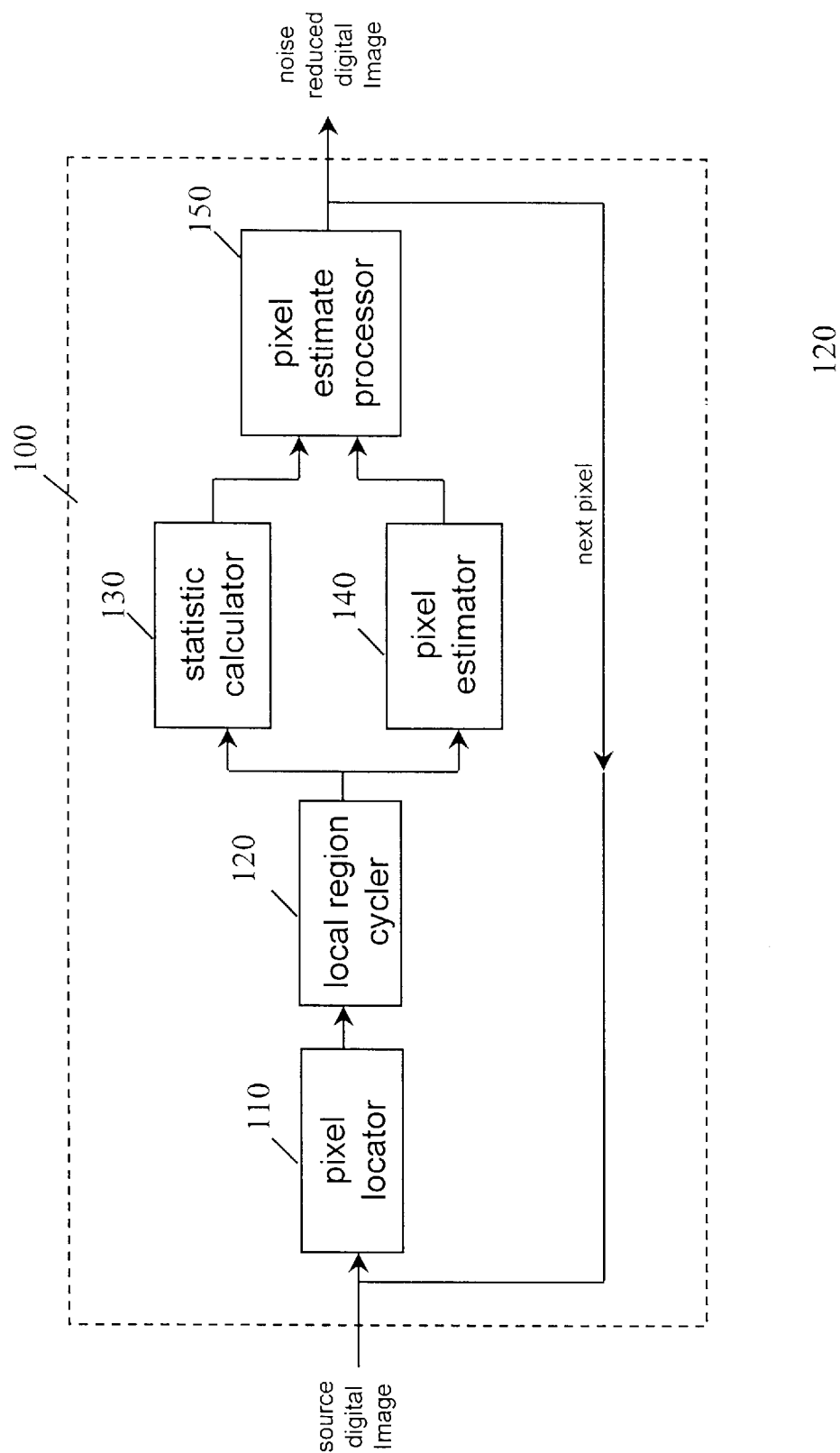
FIG. 4 is a functional block diagram of the noise reduction module shown in FIG. 3.

The noise reduction module 100 shown in FIG. 3 is illustrated in more detail in FIG. 4. The source digital image is received by the noise reduction module as one or more digital image channels. Each digital image channel is processed in sequence by the noise reduction module. The pixel locator 110 selects a pixel of interest. As illustrated, for example in FIG. 1, eight local regions which include the pixel of interest, labeled A, B, C, D, E, F, G and H are defined. The local region cycler 120 selects one local region at a time starting with local region A. The pixels of local region A are received by the statistics calculator 130 which produces a statistical weighting factor. The pixels of local region A are also received by the pixel estimator 140 which produces a noise free pixel estimate value. All the other local regions B, C, and D are caused to be processed in sequence by the local region cycler 120 in similar manner. The pixel estimate processor 150 receives the noise free pixel estimates and the statistical weighting factors corresponding to the eight local regions A, B, C, D, E, F, G and H and calculates a noise reduced pixel value. The process continues by the pixel locator 110 selecting the next pixel of interest.

The noise reduction process may be repeated for all the pixels in the digital image channel and for all the digital image channels in the digital image. Alternatively, only a subset of pixels contained in the digital image channel can be processed for noise removal.

Statistic Calculator 130

The statistic calculator 130 receives the pixel values for a given local region and calculates a statistical weighting factor $W_j$ from the pixel values. According to the present invention, the method of calculating the statistical weighting factor $W_j$ is unrelated to the method of calculating the noise free pixel estimate described below. This restriction is applied to insure that the statistical weighting factors are a pure representation of the pixel values themselves and do not include any contribution due to the statistical model of image noise employed in the noise free pixel estimation. As a result, the statistical weighting factor $W_j$ according to the present invention does not include the $X^2$ statistic employed by Kaplan et al. Authors Nagao et al. and inventors Florent et al. used methods of calculating weighting factors for the individual local regions. Methods that use the arithmetic mean essentially can be interpreted to have constant weighting factors. For the purposes of the present invention, a statistical weighting factor shall include, but not be limited to, the calculated standard deviation, the mean absolute deviation, and the pixel deviation and specifically do not include the arithmetic mean, the maximum, or the median. The main point of differentiation of the present invention lies with the aspect of a statistical weighting factor as having the property of relating to the inherent modulation or variability of pixel values. The arithmetic mean, the maximum, and the median as numerical quantities do not measure the inherent variability of pixel values.

The preferred embodiment of the present invention, the statistical weighting factor $W_j$, is a function of the standard deviation $\sigma_j$. If the N pixel values contained in the $j^{th}$ local region are represented by $p_{jk}$ for the $k_{th}$ pixel of the $j_{th}$ local region then the statistical weighting factor $\sigma_j$ based on the standard deviation for the $j^{th}$ local region is given by $$\sigma_j = \frac{1}{(N-1)} \Sigma_k (p_{jk} - p_{jave})^2 \qquad (3)$$

where $p_{jave}$ represents the average value for the pixel values given by $$p_{jave} = \frac{1}{N} \Sigma_k p_{jk} \qquad (4)$$

Some mathematical calculations for the standard deviation use the alternate formula $$\sigma_j = \frac{1}{N} \Sigma_k (p_{jk} - p_{jave})^2, \text{ and} \qquad (5)$$

$$W_j = \frac{1}{\sigma_j}. \qquad (6)$$

For either case, according to the present invention, the value of $\sigma_j$ is not allowed to fall below a pre-specified numerical value, for example one.

An alternative embodiment of the present invention uses the mean absolute deviation as a method of forming the statistical weighting factor $W_j$. The formula for the statistical weighting factor based on the mean absolute deviation (MAD) for the $j^{th}$ local region is given by $$MAD_j = \frac{1}{N} \Sigma_k |p_{jk} - p_{jave}|, \text{ and} \qquad (7)$$

$$W_j = \frac{1}{MAD_j}. \qquad (8)$$

Another alternative embodiment of the present invention uses the maximum deviation calculation to form the statistical weighting factor $W_j$. The formula for the statistical weighting factor based on the pixel deviation (PD) for the $j^{th}$ local region is given by $$PD = \text{maximum}(p_{j1}, \ldots, p_{jn}) - \text{minimum}(p_{j1}, \ldots, p_{jn}), \text{ and} \quad (9)$$

$$W_j = \frac{1}{PD_j}. \quad (10)$$

If the maximum and minimum of the pixel values in the local region are equal, the value of $PD_j$ is set to 1.0.

Pixel Estimator 140

The preferred embodiment of the pixel estimator 140 of the present invention shown in FIG. 4 uses the Sigma Filter, described by Jong-Son Lee in his journal article, "Digital Image Smoothing and the Sigma Filter," as the noise reduction logic to calculate the noise free pixel value. The values of the pixels contained in each local region are compared with the value of the pixel of interest. Each pixel in the local region is given a weighting factor of one or zero based on the absolute difference between the value of the pixel of interest and the sampled pixel value. If the absolute value of the pixel difference is less than or equal to a threshold $\epsilon$, the weighting factor is set to one; otherwise, the weighting factor is set to zero. The threshold $\epsilon$ is set to two times the expected noise standard deviation. Mathematically the expression for the calculation of the noise reduced pixel value is given as:

$$q_j = \sigma_k a_k p_{jk} / \sigma_k a_k \quad (11)$$

where $$a_k = 1 \text{ if } |p_k - p_{mn}| \leq \epsilon$$

$$a_k = 0 \text{ if } |p_k - p_{mn}| > \epsilon$$

and $p_{jk}$ represents the $k^{th}$ pixel contained in the $j^{th}$ local region, $p_{mn}$ represents the value of the pixel of interest located at row m and column n, $a_k$ represents a weighting factor, $\epsilon$ represent a threshold value and $q_j$ represents the noise free pixel estimate. The summations of the weighted average of pixel values and of the weighting factors is performed in the statistics calculator 130.

The preferred embodiment of the present invention uses a signal dependent noise feature incorporated into the expression for $\epsilon$ given by $$\epsilon = Sfac \; \sigma_n(p_{mn}) \quad (12)$$

where $\sigma_n$ represents the noise standard deviation of the source image evaluated at the pixel of interest value $p_{mn}$. The parameter Sfac is a scale factor that can be used to vary the degree of noise reduction. The optimum value for Sfac is somewhat a matter of view preference but good algorithm performance may be achieved with Sfac values in the range of 1.5 to 2.0. The implementation of $\sigma_n$ is in the form of a look-up-table (LUT) of standard deviation values that are pre-computed for the intended source of imagery. For color digital imaging applications a separate noise table of $\sigma_n$ values is used—one for each digital image channel corresponding to each color of the color digital image.

An alternative embodiment of the present invention uses a median filter to calculate the noise free pixel estimate. The noise free pixel estimate produced with a median filter is derived by calculating the statistical median of values taken from the pixel values contained in the local region.

Pixel Estimate Processor 150

Referring to FIG. 4, the pixel estimate processor 150 receives the statistical weighting factors $W_j$ and the noise free pixel estimates $q_j$ from the M local regions. The noise reduced pixel value $q_{mn}$ corresponding to the pixel of interest is calculated by performing a weighted sum of the statistical weighting factors $W_j$. Mathematically, the calculation of the noise reduced pixel value $q_{mn}$ is given by $$q_{mn} = \frac{\sum_j q_j W_j^\eta}{\sum_k W_k^\eta} \quad (13)$$

where the summation includes all the M local regions and the $\eta$ parameter represents exponent of the statistical weighting factors $W_j$. Although a variety of values for $\eta$ will produce good results, the preferred embodiment of the present invention used a value of 2. With a value of 2 for $\eta$, the effective weighting factor is the inverse of the statistical variance of the pixel values contained in the individual local regions.

The chief advantage of the present invention over other methods of weighting noise free pixel estimates lies in the fact that each estimate has the potential for contributing to the noise reduced pixel value more or less equally in spatially flat regions of images. Equally important is the fact that spatially active image regions tend to produce some noise free pixel estimates that should not contribute to the noise reduced pixel value. These bad estimates tend to come from local regions with high pixel modulation or variability. Thus the inverse variance weighting of noise free pixel estimates has the overall property of maximal noise cleaning in structurally flat regions while giving emphasis to good estimates in spatially active image regions.

The invention has been described in detail with particular reference to certain preferred embodiments thereof, but it will be understood that variations and modifications can be effected within the spirit and scope of the invention.

| PARTS LIST | |
|---|---|
| 10 | image capture device |
| 20 | digital image processor |
| 22 | enhancement transform module |
| 23 | enhancement transform module |
| 30 | image output device |
| 40 | general control computer |
| 50 | monitor device |
| 60 | input control device |
| 70 | offline memory device |
| 100 | noise reduction module |
| 110 | pixel locator |
| 120 | local region cycler |
| 130 | statistic calculator |
| 140 | pixel estimator |
| 150 | pixel estimate processor |
| 210 | pixel of interest |
| 220 | local region |

What is claimed is:

1. A method of processing a digital image channel to remove noise, comprising the steps of:
    a) identifying a pixel of interest;
    b) identifying at least two sampled local regions of pixels which include the pixel of interest;
    c) calculating a noise free pixel estimate for each sampled local region of pixels;
    d) calculating a statistical weighting factor for each sampled local region, the calculation of the statistical weighting factor being independent of the calculation of the noise free pixel estimate; and
    e) using the noise free pixel estimates and the statistical weighting factors to calculate a noise reduced pixel value.

2. The method claimed in claim 1, wherein steps a) through e) are repeated for all pixels in the image.

3. The method claimed in claim 1, wherein the image includes a plurality of channels and wherein steps a) through e) are repeated for all pixels in all of the channels of the digital image.

4. The method claimed in claim 1, wherein the sampled local regions define radial patterns of pixels emanating from the pixel of interest.

5. The method claimed in claim 1, wherein the statistical weighting factor is a function of a standard deviation of the pixel values in the sampled local regions.

6. The method claimed in claim 5, wherein the function is a power function.

7. The method claimed in claim 1, wherein the statistical weighting factor is a function of a mean absolute deviation of the pixel values in the sampled local regions.

8. The method claimed in claim 7, wherein the function is a power function.

9. The method claimed in claim 1, wherein the statistical weighting factor is a function of the maximum deviation of the pixel values in the sampled local regions.

10. The method claimed in claim 9, wherein the function is a power function.

11. A computer program product for performing the method of claim 1.

12. Apparatus for processing a digital image channel to remove noise, comprising:
   a) means for identifying a pixel of interest;
   b) means for identifying at least two sampled local regions of pixels which include the pixel of interest;
   c) means for calculating a noise free pixel estimate for each sampled local region of pixels;
   d) means for calculating a statistical weighting factor for each sampled local region, the calculation of the statistical weighting factor being independent of the calculation of the noise free pixel estimate; and
   e) means for using the noise free pixel estimates and the statistical weighting factors to calculate a noise reduced pixel value.

13. The apparatus claimed in claim 12, further comprising means for calculating a noise reduced pixel value for all pixels in the image.

14. The apparatus claimed in claim 12, wherein the image includes a plurality of channels and wherein the apparatus further includes means for calculating a noise reduce pixel value for all pixels in all of the channels of the digital image.

15. The apparatus claimed in claim 12, wherein the sampled local regions define radial patterns of pixels emanating from the pixel of interest.

16. The apparatus claimed in claim 12, wherein the statistical weighting factor is a function of a standard deviation of the pixel values in the sampled local regions.

17. The apparatus claimed in claim 16, wherein the function is a power function.

18. The apparatus claimed in claim 12, wherein the statistical weighting factor is a function of a mean absolute deviation of the pixel values in the sampled local regions.

19. The apparatus claimed in claim 18, wherein the function is a power function.

20. The apparatus claimed in claim 12, wherein the statistical weighting factor is a function of the maximum deviation of the pixel values in the sampled local regions.

21. The apparatus claimed in claim 20, wherein the function is a power function.

* * * * *